United States Patent
Hirthammer

(10) Patent No.: US 12,426,587 B2
(45) Date of Patent: Sep. 30, 2025

(54) POSITIONING APPARATUS FOR AN AGRICULTURAL DISTRIBUTION MACHINE

(71) Applicant: HORSCH LEEB Application Systems GmbH, Landau an der Isar (DE)

(72) Inventor: Daniel Hirthammer, Schwandorf (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 940 days.

(21) Appl. No.: 17/066,111

(22) Filed: Oct. 8, 2020

(65) Prior Publication Data

US 2021/0105994 A1    Apr. 15, 2021

(30) Foreign Application Priority Data

Oct. 10, 2019   (DE) .......................... 102019127305.6

(51) Int. Cl.
| | | |
|---|---|---|
| A01M 7/00 | (2006.01) | |
| A01C 23/00 | (2006.01) | |
| F15B 13/02 | (2006.01) | |
| F15B 21/02 | (2006.01) | |
| G01C 9/08 | (2006.01) | |

(52) U.S. Cl.
CPC ........... *A01M 7/0057* (2013.01); *A01C 23/00* (2013.01); *F15B 13/02* (2013.01); *F15B 21/02* (2013.01); *G01C 9/08* (2013.01); *F15B 2211/526* (2013.01); *F15B 2211/6306* (2013.01); *F15B 2211/6653* (2013.01)

(58) Field of Classification Search
None
See application file for complete search history.

(56) References Cited

U.S. PATENT DOCUMENTS

| | | |
|---|---|---|
| 9,832,925 B2 | 12/2017 | Leeb |
| 10,244,747 B2 | 4/2019 | Leeb et al. |
| 10,470,361 B2 | 11/2019 | Leeb et al. |

(Continued)

FOREIGN PATENT DOCUMENTS

| | | |
|---|---|---|
| CN | 206587953 U | 10/2017 |
| DE | 202014011019 U1 | 5/2017 |

(Continued)

OTHER PUBLICATIONS

Translation of DE 102016225043 A1. (Year: 2018).*

*Primary Examiner* — James J Lee
*Assistant Examiner* — Jonathan E Reinert
(74) *Attorney, Agent, or Firm* — AVEK IP, LLC; Mark C. Young

(57) ABSTRACT

An agricultural distribution machine, such as a field sprayer or a pneumatic fertilizer spreader is described. The agricultural distribution machine includes a carrier vehicle and a distributor boom for spreading material, such as a fertilizer, a plant protection agent, or seed. The boom is indirectly or directly arranged on the carrier vehicle so as to be movable at least about a pivot axis running in the direction of travel. The boom has segments which are pivotable relative to one another about upright axes and/or in a plane arranged perpendicular to the direction of travel of the agricultural distribution machine. The boom includes an acceleration-compensated inclinometer apparatus for determining a rotational position of the distributor boom.

18 Claims, 7 Drawing Sheets

(56) References Cited

U.S. PATENT DOCUMENTS

| | | |
|---|---|---|
| 2011/0054729 A1 | 3/2011 | Whitehead et al. |
| 2016/0175869 A1 | 6/2016 | Sullivan et al. |
| 2016/0205864 A1* | 7/2016 | Gattis .................. A01C 23/008 |
| 2016/0255769 A1* | 9/2016 | Leeb .................... A01C 23/007 |
| 2016/0286780 A1 | 10/2016 | Leeb et al. |
| 2017/0113497 A1 | 4/2017 | Schott et al. |
| 2017/0359955 A1* | 12/2017 | Dunn ..................... F15B 11/08 |
| 2018/0027727 A1 | 2/2018 | Leeb |
| 2022/0325774 A1* | 10/2022 | Oberheide ........... A01C 23/008 |

FOREIGN PATENT DOCUMENTS

| | | |
|---|---|---|
| EP | 2591657 A1 | 5/2013 |
| EP | 3007553 B1 | 9/2014 |
| EP | 3007553 A1 | 4/2016 |
| EP | 3183963 A1 | 6/2017 |
| EP | 3447443 A1 | 2/2019 |
| EP | 3449723 A1 | 3/2019 |
| WO | 2015067804 A1 | 5/2015 |
| WO | 2016132023 A1 | 8/2016 |

* cited by examiner

POSITIONING APPARATUS FOR AN AGRICULTURAL DISTRIBUTION MACHINE

CROSS-REFERENCE TO RELATED APPLICATION

This application claims priority from German patent application No. DE 10 2019 127 305.6 filed Oct. 10, 2019, the disclosure of which is hereby incorporated herein in its entirety by reference.

BACKGROUND

Prior art agricultural distribution machines comprise a carrier vehicle, a distributor boom for spreading material, such as fertilizer, plant protection agent or seed, which is indirectly or directly arranged on the carrier vehicle so as to be movable at least about a pivot axis running in the direction of travel and a control apparatus for controlling and/or regulating a rotational position of the distributor boom about the pivot axis.

In order to spread the material over a large surface area on the agricultural field to be cultivated, distributor booms of such field sprayers or pneumatic fertilizer spreaders have lateral cantilevered arms with a large working width, in some cases of more than twenty meters, on which spreading means, for example spray nozzles in field sprayers or deflector plates in pneumatic fertilizer spreaders, are arranged. For transport journeys, such wide spray booms are folded and collapsed.

For efficient spreading, in particular for a coverage of the ground with material which is as uniform as possible, the distance between the distributor boom and the agricultural field is intended to remain as uniform as possible over the entire working width. For this reason, in the case of greater dimensions of the cantilevered arms and the working width associated therewith, there is the need to guide the spray boom at a distance from the ground which is as uniform as possible, since even small oblique positions of the spray boom will lead to significant differences in the distance of the spreading means along the distributor boom, for example the spray nozzles, from the ground. Inadvertent fluctuations of the distributor boom may also increase undesired drift of the material to be spread.

To this end, it is known to suspend a distributor boom on a carrier vehicle so as to be rotatable about a central point, at least about a rotational axis. The rotational axis in this case preferably runs parallel to the longitudinal axis and/or to the direction of travel of the carrier vehicle. In order to ensure a uniform spreading of the material, the distance between the upper edge of the plant population and the spreading means is continuously regulated to a defined distance.

In this case, a plurality of approaches are known from the prior art in order to keep the distributor boom as far as possible in the desired target rotational position, to detect deviations from the target rotational position and in the case of deviations of the distributor boom to return the distributor boom back to the target rotational position by means of a controlling apparatus.

By way of example, reference is made to EP 2 591 657 B1. It is proposed herein to provide a controlling apparatus, the rotational position of the distributor boom being able to be altered thereby and said controlling apparatus optionally being able to be operated in a first operating mode or a second operating mode. In this case, a substantially adjustment force-free mechanical connection is produced in a first operating mode in which the spreading boom is substantially decoupled from torques about the pivot axis through the suspension point, resulting from vehicle movements about the vehicle longitudinal axis. The adjustment force-free connection may be produced and maintained, for example, by means of controlling movements of the controlling apparatus approximately following in real time the relative movements between the spreading boom and/or the central part thereof and the carrier vehicle. In a second operating mode, therefore, a defined adjustment force and/or a defined controlling torque may be introduced into the distributor boom for the displacement thereof.

In agricultural distribution machines known from experience, for determining the rotational position of the distributor boom, standard inclinometers which measure the angle (inclination) of an object relative to gravity, also denoted as gravity-type inclinometers, are used, i.e. in the case of a measurement of the inclination, the angle of the gravitational acceleration vector to the measured object is measured in a vertical plane. Examples thereof are so-called MEMS inclinometers. Such conventional gravity-type inclinometers, however, have the drawback that external acceleration leads to errors in the measured inclination angle, since in this case the gravitational acceleration and the external acceleration are superimposed and vectorially added together. This problem occurs, however, to a particular extent when agricultural distribution machines travel on uneven terrain since in this case further, very diverse accelerations may act on the measured object in addition to the gravitational acceleration, for example accelerations produced by rolling movements of the carrier vehicle on uneven terrain, horizontal accelerations when accelerating and braking, centrifugal accelerations when cornering, and etc.

Accordingly, the detection of the rotational position of the distributor boom by such a conventional inclinometer is prone to error, which in turn leads to inaccuracies during the control or regulation of the rotational position of the distributor boom.

One possible approach for solving this problem is disclosed in EP 3 007 553 B1. For the accurate determination of the rotational position of the distributor boom about the pivot axis, it is proposed to determine a present rotational position of the boom by using time integration of an angular velocity detected by an angular rate sensor, to calculate a rotational position of the distributor boom and to combine the calculated rotational position with a directly measured rotational position of a rotation angle sensor. Using the rotational position thus determined, the rotational position of the distributor boom is thereby regulated or controlled. There is a need to improve this approach further in order to improve further the regulation of the boom on the basis of a measured rotational position of the boom.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, an improved approach for controlling and/or regulating a rotational position of a distributor boom of an agricultural distribution machine, the drawbacks of conventional techniques being able to be avoided thereby. In particular, a particularly accurate and at the same time cost-effective technique for controlling and/or regulating a rotational position of a distributor boom of an agricultural distribution machine is described.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

From a general point of view, the present disclosure relates to an agricultural distribution machine, also denoted hereinafter in short as a distribution machine or agricultural machine. This machine comprises a carrier vehicle and a distributor boom for spreading material, such as fertilizer, plant protection agent or seed. The distributor boom, also denoted as the spreading boom, is indirectly or directly arranged on the carrier vehicle so as to be movable at least about a pivot axis running in the direction of travel of the carrier vehicle. The pivot axis may be a pivot axis which extends in the longitudinal direction of the carrier vehicle. The distributor boom has a large working width, i.e. a working width which is substantially greater than a width of the carrier vehicle, for example a multiple of the width of the carrier vehicle. The working width of the distributor boom, i.e. the width in the working position or in the fully folded-out state may be at least 18 meters. The distributor boom may have segments which are pivotable relative to one another, which are pivotable relative to one another about upright axes, and/or which are pivotable relative to one another in a plane arranged perpendicular to the direction of travel, in particular to the forward direction of travel, of the distribution machine.

According to exemplary embodiments, the agricultural distribution machine comprises an acceleration-compensated inclinometer apparatus for determining a rotational position of the distributor boom. An acceleration-compensated inclinometer apparatus may be understood as an inclinometer apparatus which comprises means for compensating for external accelerations, so that errors in the inclination measurement due to such external accelerations may be avoided or at least reduced. External accelerations are understood as accelerations which act in addition to the gravitational acceleration on the inclinometer apparatus, such as for example transverse accelerations. An acceleration-compensated inclinometer apparatus may also be understood as an inclinometer apparatus which outputs an acceleration-compensated inclination signal. An acceleration-compensated inclination signal is an inclination signal which is corrected relative to external acceleration effects which cause errors in the inclination measurement, in order to avoid or at least to reduce errors in the inclination measurement due to such external accelerations.

An agricultural distribution machine which is provided with an acceleration-compensated inclinometer apparatus provides the advantage of a particularly accurate rotational position measurement which is particularly advantageous, in particular, in the case of travelling on uneven terrain and the external accelerations which occur there and which fluctuate significantly. A further advantage is that a compact rotational position sensor unit may be provided for the distribution machine.

In one embodiment, the acceleration-compensated inclinometer apparatus comprises an acceleration sensor and/or an angular rate sensor, preferably a gyroscope. In this case, the inclinometer apparatus may also be configured to deduct disturbance variables which occur as a function of the measured values of the acceleration sensor and/or angular rate sensor which incur errors in an inclination measurement and which are caused by external accelerations, preferably transverse accelerations, which act in addition to the gravitational acceleration on the inclinometer apparatus. The aforementioned means for compensating external accelerations may comprise, for example, such an acceleration sensor and/or angular rate sensor and may be configured to deduct the disturbance variables. The additional integration of the acceleration sensor and/or the angular rate sensor into the inclinometer apparatus thus provides the advantage that the disturbance variables acting on the inclinometer apparatus may be directly measured at the point of the inclination measurement and the effects thereof on the inclination measurement may be correspondingly accurately deducted.

In one embodiment, the acceleration-compensated inclinometer apparatus comprises a first inclinometer apparatus and a second inclinometer apparatus. In this case, the second inclinometer apparatus is based on a measuring principle which is different compared to the first inclinometer apparatus. In this case, both the first and the second inclinometer apparatus are configured to measure measured variables from which an inclination may be directly or indirectly determined. Measured variables from which the inclination may be indirectly determined are, for example, the measured angular rate or the acceleration since the rotational position is able to be calculated from the angular rate via a time integration and is able to be calculated accordingly from the measured acceleration via a second time integration. In this embodiment, the acceleration-compensated inclinometer apparatus also comprises a fusion apparatus for sensor data fusion, which is configured to compute measured values of the first inclinometer apparatus with measured values of the second inclinometer apparatus in order to compensate for the effects of movement-related accelerations on the inclination measurement.

This embodiment provides the advantage that by linking the measurement results with the techniques known per se of sensor data fusion, the advantages and drawbacks of different measuring principles may be used in order to achieve an inclination measurement with greater accuracy than the accuracy which might be achievable if each measuring principle were only to be used individually.

Merely by way of example, fusion algorithms based on recursive Bayes estimation may be used. For example, Kalman filters or particle filters for multi-modal probability distribution between the inclinometer apparatuses may be used.

According to one aspect, the acceleration-compensated inclinometer apparatus may be arranged on the distributor boom, preferably on the central part of the distributor boom.

According to one possible further aspect, in this case the first inclinometer apparatus may be designed as an inclinometer which measures an inclination relative to gravity and the inclination measurement thereof incurs errors due to external accelerations which occur in addition to the gravitational acceleration. Such inclinometers may also be denoted as static or quasi-static inclinometers. Moreover, the second inclinometer apparatus may comprise an acceleration sensor and/or angular rate sensor. According to an optional variant of this aspect, the fusion apparatus may be configured to integrate over time the measured values of the second inclinometer apparatus for determining a rotational position of the distributor boom and may be configured, by means of a data fusion calculation, to link or combine, i.e. to fuse, the time-integrated values with the measured values of the first inclinometer apparatus for determining an acceleration-compensated rotational position of the distributor boom. For example, in this case, by means of the fusion apparatus a sensor data fusion of the measured rotational position with a calculated rotational position which has been calculated by a time integration may be used, as is disclosed in EP 3 007 553 B1. This provides the advantage that disturbance effects, caused by external accelerations, may be deducted using the calculated rotational position, whilst so-called angle drift errors in the calculated rotational position may be compensated by the directly measured rotational position.

According to a particularly preferred embodiment, it is provided that the components of the acceleration-compensated inclinometer apparatus are housed by a common housing and/or are configured as a structural unit. The term "components" includes all sensor apparatuses and data processing apparatuses of the acceleration-compensated inclinometer apparatus which are required for determining the acceleration-compensated inclination signal. According to the aforementioned embodiments, therefore, the first inclinometer apparatus, the second inclinometer apparatus and the fusion apparatus may be housed as components by a common housing of the acceleration-compensated inclinometer apparatus. This provides the advantage of a simple assembly and compact arrangement on the distributor boom and reduced cabling effort.

Alternatively or additionally, the components of the acceleration-compensated inclinometer apparatus may be coupled together mechanically so that these components are subjected to the same inclination and/or the same acceleration. Moreover, the components of the acceleration-compensated inclinometer apparatus may be arranged at the same location on the distributor boom, preferably on the central part of the distributor boom.

The agricultural distribution machine may have a distance sensor apparatus which is configured, in a known manner, to detect a distance of the distributor boom from a ground surface and/or a plant population. The distance sensor apparatus may comprise ultrasonic sensors arranged on the distributor boom, which measure a distance from the ground. The distance sensor apparatuses may also be configured to measure in each case a distance of the segment from the ground and/or from the plant population, from a plurality of segments of the distributor boom, and to this end preferably comprise a plurality of distance sensors which are arranged on different segments.

The distribution machine may also comprise an adjustment apparatus, an adjustment force being able to be generated thereby in order to move the distributor boom about the pivot axis. To this end, the adjustment apparatus may comprise an adjustment member which is actuated pneumatically, hydraulically or electromotively and which is indirectly or directly fastened both to the distributor boom and to the carrier vehicle, and via a generated adjustment force may influence a rotational position of the distributor boom. The controlling member may be designed as a displacement cylinder.

The distribution machine may also comprise a control apparatus for controlling and/or regulating a rotational position of the distributor boom about the pivot axis, wherein the control apparatus is configured to generate control signals for activating the adjustment apparatus, as a function of the output signals of the acceleration-compensated inclinometer apparatus.

In one embodiment, the control apparatus is configured to determine a current rotational position of the distributor boom merely as a function of the output signals of the acceleration-compensated inclinometer apparatus.

Alternatively, there is the possibility that the control apparatus is configured to determine a current rotational position of the distributor boom as a function of the output signals of the acceleration-compensated inclinometer apparatus and the output signals of a rotation angle sensor which is arranged between the carrier vehicle and the distributor boom and which detects a relative rotation between the carrier vehicle and the distributor boom.

In a preferred embodiment, the adjustment apparatus is configured as a pressure medium-actuated adjustment apparatus, for example as a pneumatically or hydraulically operating adjustment apparatus. Moreover, the pressure medium-actuated adjustment apparatus may be designed as a pressure medium-actuated adjustment apparatus with two effective regions acting substantially opposingly, an adjustment force being able to be generated thereby in order to move the distributor boom about the pivot axis. In this case, a pressure medium control valve is assigned to each effective region for controlling a pressure or volumetric flow prevailing on the respective effective region. The pressure medium-actuated adjustment apparatus comprises at least one pressure medium-actuated actuator.

The "effective region" of the adjustment apparatus and/or the actuator is understood as a region of the adjustment apparatus and/or the actuator in which the compressive force of the pressure medium is converted or may be converted into a movement of a controlling member of the adjustment apparatus and/or the actuator. It is intended to be understood by "two effective regions acting substantially opposingly" that a compressive force of the pressure medium in the one effective region generates a displacement force on the distributor boom in the one direction about the pivot axis and a compressive force of pressure medium in the other effective region generates a displacement force on the distributor boom in the opposing direction about the pivot axis. In other words, a pressure medium control valve may be used for each direction for pivoting the distributor boom (clockwise or counter-clockwise).

The control apparatus may also be configured to determine, as a function of the rotational position of the distributor boom determined by means of the acceleration-compensated inclinometer apparatus, a predetermined target value of a pressure acting on the effective regions or an adjustment force, e.g. compressive force, of the pressure medium acting on the effective regions and to set the pressure medium control valves, in each case by being electrically controlled, to the predetermined target value.

This embodiment of the agricultural distribution machine provides the particular advantage that the pressure medium control valves, in combination with the acceleration-compensated rotational position measurement, permit a particularly precise and rapid control of the forces acting on the effective regions for controlling and/or regulating the position of the distributor boom.

According to yet another embodiment, the control apparatus may also be configured to set the pressure medium control valves in each case using a predetermined characteristic curve of the pressure medium control valves, by being electrically controlled, to the predetermined target value. The characteristic curve of the pressure medium control valves establishes a connection between the predetermined target value, for example the pressure at the effective regions, and the electrical activation signal, for example the current applied, at the pressure medium control valves. This has the advantage that via the characteristic curve of the pressure medium control valves, the pressure on the distributor boom may be adapted precisely to the predetermined target value.

As a result, the pressure medium control valves operate such that the desired predetermined target value is set at the respective effective region, for example the desired pressure or volumetric flow is set there. The characteristic curve may be stored in the control apparatus or a data store of the agricultural machine. A characteristic curve may be stored and/or provided which applies to both of the two pressure medium control valves, if these pressure medium control valves are designed, for example, to be structurally the same. Moreover, a separate characteristic curve may be stored and/or provided for each pressure medium control valve.

If, for example, the predetermined target value, determined as a function of the current rotational position, predetermines which pressure or volumetric flow of the pressure medium is required at the effective regions, using the characteristic curve the electrical activation signal of the pressure medium control valves, for example the current applied thereto, may be determined and used for the active control and/or regulation of the rotational position of the distributor boom. If merely by way of example a defined difference in pressure or a defined difference in force is intended to prevail at the effective regions, the pressure medium control valves which preferably operate in opposing directions in each case are accordingly activated electrically on the basis of the characteristic curve(s) stored in the control apparatus, thus generating a defined difference in pressure and/or a defined difference in force.

A particular advantage of these embodiments, therefore, is that a particularly cost-effective construction is permitted since for regulating or controlling the rotational position of the distributor boom preferably only the acceleration-compensated inclinometer apparatus is used and in addition to the pressure medium control valves, however, no further pressure sensor unit or force sensors which are coupled to the adjustment apparatus or integrated therein are required.

Accordingly, in a further embodiment the control apparatus is configured to determine the predetermined target value without a pressure value or volumetric flow value of the pressure medium detected by sensor. Moreover, the control apparatus may be configured to determine a control current for activating the pressure medium control valves exclusively using the characteristic curve and the rotational position of the distributor boom detected by means of the acceleration-compensated inclinometer apparatus. This provides the advantage that a particularly efficient control and/or regulation of the rotational position of the distributor boom is permitted.

According to a further embodiment, the control apparatus is configured, if the determined rotational position corresponds to a target rotational position of the distributor boom and/or no longer deviates by a threshold value from the target rotational position, to keep constant an electrical activation signal of the pressure medium control valves assigned to the predetermined target value. Moreover, in this case it may be provided not to introduce any adjustment forces into the distributor boom. This may be preferably carried out such that, for example, pressure peaks or force fluctuations on the effective regions, caused by rolling movements of the carrier vehicle or by movements of the boom, may be automatically compensated by the pressure medium control valves and/or by the pressure predetermined on the basis of the predetermined target value or the correspondingly predetermined force being kept constant.

It is intended to be understood by "introducing no adjustment forces into the distributor boom" in this connection that no displacement forces are introduced for altering the rotational position of the distributor boom. Instead, the continuous activation signal of the pressure medium control valves ensures that disturbance torques introduced into the distributor boom, for example resulting from rolling movements of the carrier vehicle, are immediately equalized, for example compensated, so that these disturbance torques do not lead to an undesired alteration of the rotational position and undesired displacement of the distributor boom.

Accordingly, the control apparatus may be configured, if the determined rotational position corresponds to a target rotational position of the distributor boom and/or no longer deviates by a threshold value from the target rotational position, to implement an operating mode in which the distributor boom is substantially decoupled from torques about the pivot axis resulting from vehicle movements about the vehicle longitudinal axis, wherein an electrical activation signal of the pressure medium control valves corresponding to the predetermined target value is kept constant. This operating mode is also denoted hereinafter as the first operating mode, for greater differentiation from a further second operating mode. In this case, however, it is of great advantage that the current rotational position in all operating situations may be determined as far as possible without error, since otherwise in the first operating mode the risk is present that an adjustment is not made to the correct target rotational position. The accurate determination in all operating situations may be achieved reliably with an acceleration-compensated rotational position sensor.

In a further embodiment, the control apparatus is configured, if the determined rotational position deviates from the target rotational position of the distributor boom or if the determined rotational position deviates by more than a threshold value from the target rotational position, to implement a second operating mode in which an adjustment force is introduced via the adjustment apparatus into the distributor boom, until this distributor boom has been rotated into the target rotational position. In this case, the control apparatus may be configured to determine corresponding predetermined target values for each of the effective regions, so that a corresponding displacement force is generated via the effective regions, which has the effect that the distributor boom rotates toward the target rotational position. After reaching the target rotational position, it is possible to change back to the first operating mode.

By way of example, in the second operating mode the predetermined target values may be determined and/or predetermined as follows: a predetermined target value, hereinafter denoted as the first predetermined target value, which effects a movement of the distributor boom toward the target rotational position; a further predetermined target value, hereinafter denoted as the third predetermined target value, which effects a holding of the distributor boom in the target rotational position, and at least one further predetermined target value, hereinafter denoted as the second predetermined target value, the value thereof being between the first and the third predetermined target value. According to this further embodiment, the control apparatus is configured to set the pressure medium control valves, in each case by being electrically controlled, initially to the first predetermined target value and then before reaching the target rotational position to the at least one second predetermined target value and when reaching the predetermined target value to the third predetermined target value.

This provides the advantage that with a displacement of the distributor boom into the desired target rotational position, the distributor boom is actively braked and/or damped before reaching the target rotational position so that a rapid setting of the target rotational position, as far as possible without, or with little, overshooting, is possible, wherein to this end advantageously the pressure medium valves, by being electrically activated, only have to be set to the first, second and third predetermined target value. The target rotational position, for example, may be determined by means of distance sensors arranged on the distributor boom which measure the distance of the distributor boom from the ground or plant population. The distance sensors may be designed as ultrasonic sensors.

In order to implement a particularly advantageous activation of the pressure medium control valves in terms of control or regulating technique, in this case, optionally, it may be further provided that the setting of the pressure medium control valves to the first, second and third predetermined target value takes place using the predetermined characteristic curve, as mentioned above. Preferably, in this case this activation of the pressure medium control valves may be carried out exclusively using the predetermined characteristic curve. This means that using the characteristic curve the electrical activation values, for example the values of current applied, for the pressure medium valves which in each case correspond to the first predetermined target value, the at least one second predetermined target value and the third predetermined target value are determined, and the pressure medium control valves are then correspondingly activated only on the basis of these activation values.

According to a variant of this embodiment, it is provided that a plurality of second predetermined target values are determined for each effective region, preferably such that the third predetermined target value is set to rise or fall in a stepwise manner starting from the first predetermined target value, by means of the second predetermined target value. As a result, the target rotational position may be set in a particularly accurate manner and overshooting may be avoided in a particularly reliable manner.

At the locations of a stepwise and/or stepped setting of the transition from the third predetermined target value, starting from the first predetermined target value, a plurality of second predetermined target values may also be determined so that a continuous, or approximately continuous, transition is implemented. In practice, however, it has been shown within the scope of exemplary embodiments that due to the relatively high inertia of the distributor boom, a few second predetermined target values are sufficient.

Alternatively or additionally, the control apparatus may be configured to establish the at least one second predetermined target value, preferably the number thereof and/or deviation from the first and third predetermined target value depending on the deviation of the specific rotational position from the target rotational position of the distributor boom. As a result, the setting of the desired target rotational position may be further improved.

According to a particularly advantageous embodiment, the pressure medium control valves are designed as pressure control valves, for example as electromagnetically activated proportional pressure control valves. As an alternative to a pressure regulation at the effective regions, a volumetric flow regulation may also be implemented. According to this variant, the pressure medium control valves may be designed as volumetric flow control valves, for example as electromagnetically activated volumetric flow control valves.

In one embodiment, the adjustment apparatus may comprise a dual-acting fluidic pressure medium cylinder, for forming the two effective regions which act substantially opposingly. Alternatively, the adjustment apparatus may comprise two single-acting, fluidic pressure medium cylinders which operate opposingly, for forming the two effective regions which act substantially opposingly. In a particularly advantageous variant, the two single-acting fluidic pressure medium cylinders which operate opposingly may be designed in each case as plunger cylinders.

The aforementioned fluidic pressure medium cylinders may be designed as hydraulically operating or pneumatically operating pressure medium cylinders.

According to an embodiment, the adjustment apparatus is configured to move the distributor boom optionally in both rotational directions about the pivot axis running in the direction of travel at an angular velocity of at least 0.1 rad/s, further preferably of at least 0.2 rad/s. To this end, the adjustment apparatus may be designed accordingly, for example by a movement speed of the controlling member of the adjustment apparatus acting on the boom, for example of a hydraulic or pneumatic cylinder, being selected to be correspondingly high, taking into account the effective lever arm of the controlling member. For example, the adjustment apparatus may be configured to achieve movement speeds which are in the range of 100 m/s and 500 m/s.

Moreover, one respective pressure medium line section may be connected to each effective region of the adjustment apparatus, the pressure medium being able to be supplied thereby to the effective regions and discharged therefrom. In this case, one of the pressure medium control valves for controlling a pressure or volumetric flow prevailing at the respective effective region is arranged in each pressure medium line section. It may also be provided that the pressure medium control valves in each case are not assigned a check valve, i.e. according to this variant a check valve is not arranged in a pressure medium line section comprising the pressure medium valve.

The agricultural distribution machine may be a field sprayer. According to this embodiment, the distributor boom is a spray boom with cantilevered arms protruding on either side of the carrier vehicle as well as spreading means which are arranged thereon and which are connected and/or connectable to a reservoir for at least one liquid and/or solid active agent, such as for example spray nozzles connected and/or connectable to a spraying agent tank.

The agricultural distribution machine may be a pneumatic fertilizer spreader. The fertilizer spreader may be a fertilizer spreader for distributing granular fertilizer. The fertilizer spreader may comprise a storage container for the fertilizer to be distributed. The fertilizer spreader may comprise a plurality of distribution elements arranged on the distributor boom for the spreading of granular fertilizer. The distribution elements may in each case comprise a deflector plate.

The agricultural distribution machine may be configured as a self-propelled agricultural distribution machine or as an agricultural distribution machine which is couplable and/or towed by means of a traction vehicle or as an agricultural distribution machine which may be attached and/or is attached to a traction vehicle. The self-propelled distribution machine may additionally be an autonomously travelling agricultural machine, for example a fully autonomously or partially autonomously travelling agricultural machine.

The agricultural machine may have a height adjustment apparatus for the height adjustment of the distributor boom relative to the carrier vehicle, for example designed as a parallelogram linkage with at least one controlling cylinder.

The distributor boom, which is arranged indirectly or directly on the carrier vehicle so as to be movable at least about a pivot axis running in the direction of travel, may be mounted on a carrier which in turn is coupled, for example, to a structural or frame portion or a frame construction of the carrier vehicle and/or to a rigidly or movably mounted support portion of the carrier vehicle. Moreover, the carrier may be attached in a height-adjustable manner to the structural or frame portion or a frame construction of the carrier vehicle, wherein the height adjustment may take place, in particular, by means of a four-point linkage attached between the frame construction and the carrier, for example in the form of a parallelogram. The height adjustment may also be carried out by means of a linear carriage attached between the frame construction and the carrier. For the height adjustment, the parallelogram or the linear carriage, for example, may be assigned a linear drive in the form of a hydraulic of pneumatic cylinder, so that the vertical distance between the distributor boom and a ground surface and/or a plant population is able to be altered in a variable manner.

The pivot axis may also be configured, for example, by a ball joint. The ball joint permits not only a pivoting about the pivot axis but also about a further axis.

The distributor boom may have a central part and lateral cantilevered arms which are arranged so as to be pivotable about upright, i.e. vertical, axes relative to the central part, wherein the cantilevered arms may be composed of two or more segments, in turn pivotably arranged relative to one another about upright axes. Alternatively or additionally, there is the possibility that the cantilevered arms and preferably also the segments thereof are pivotable relative to the central part in a plane arranged perpendicular to the forward direction of travel of the distribution machine for improved adaptation to a ground profile. This means that the segments may be pivotable relative to one another about an axis running in the direction of travel.

The preferred embodiments and features thereof described above are able to be combined together in any manner. Further details and advantages of exemplary embodiments are described hereinafter with reference to the accompanying drawings, in which:

BRIEF DESCRIPTION OF THE DRAWINGS

Elements which are identical or functionally equivalent are provided in all of the figures with the same reference numerals and in some cases not specifically described.

DETAILED DESCRIPTION OF THE INVENTION

Figure 1:
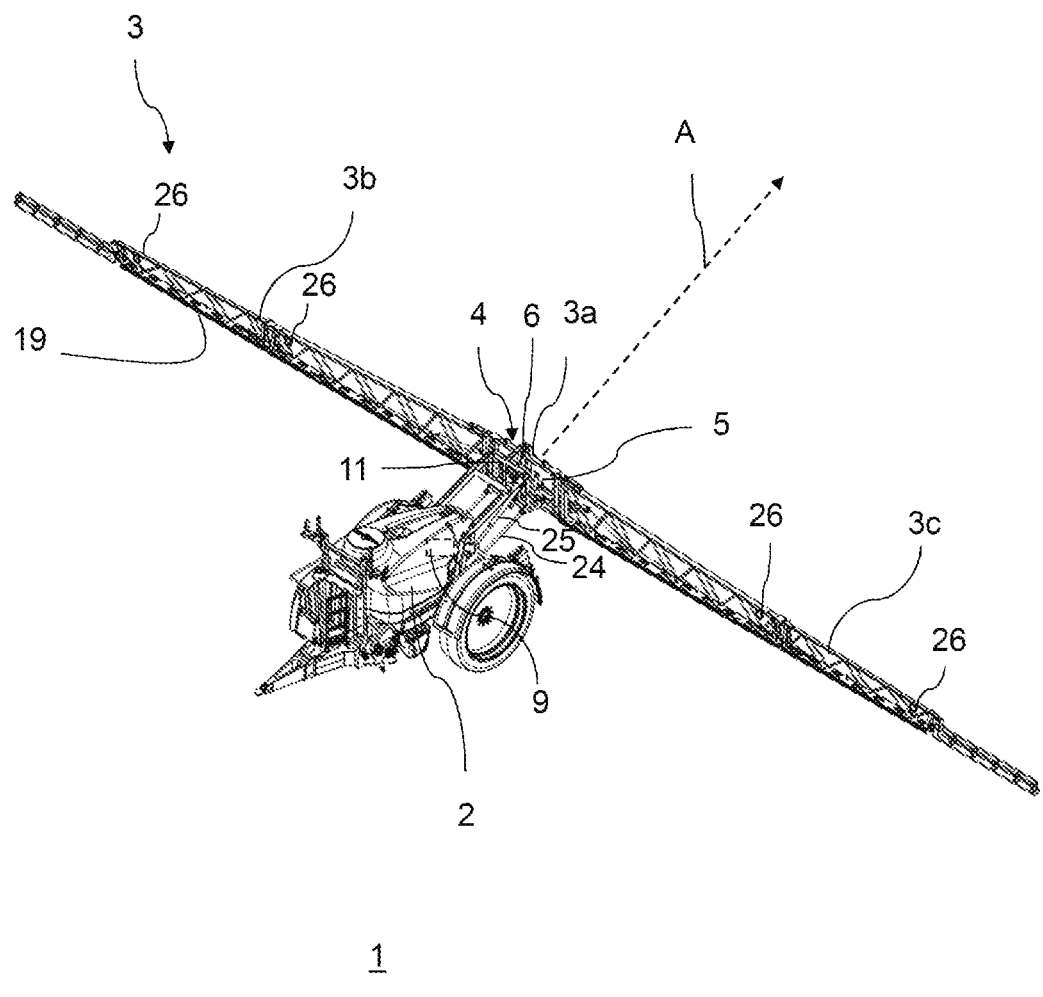
FIG. 1 shows a perspective view of an agricultural distribution machine according to an exemplary embodiment.

FIG. 1 shows a perspective view of an agricultural distribution machine 1 according to an exemplary embodiments: the agricultural distribution machine 1 is by way of example designed as a towed field sprayer. The distribution machine 1 comprises a carrier vehicle 2 and a distributor boom 3 for spreading fertilizer or plant protection agent. The distributor boom 3 is arranged on the carrier vehicle 2 so as to be movable at least about a pivot axis A running in the direction of travel, illustrated by the dashed line. The distributor boom 3, in a field sprayer denoted as a spray boom, comprises a central part 3a and two cantilevered arms 3b, 3c protruding on either side of the carrier vehicle 2. Spray nozzles and/or nozzle components 19 are arranged so as to be distributed and spaced apart along the spray boom and are fluidically connected via lines to a spraying agent tank arranged in the carrier vehicle 2. In each case two distance sensors in the form of ultrasonic sensors 26 are also arranged on each cantilevered arm 3b, 3c, said ultrasonic sensors measuring the distance of the boom from the ground and/or from the plant population.

The distribution machine 1 further comprises an acceleration-compensated inclinometer apparatus 5 (hereinafter described in short as an acceleration-compensated inclinometer 5) for determining a rotational position of the distributor boom 3, and which is arranged in the region of the central part 3a of the distributor boom 3. The construction of the acceleration-compensated inclinometer 5 is shown schematically in FIG. 7.

In contrast to a conventional gravity-type inclinometer, in which the output signal of the inclination measurement incurs errors by external accelerations which act in addition to the gravitational acceleration on the measured object, for example accelerations produced by rolling movements of the carrier vehicle on uneven terrain, horizontal accelerations when accelerating and braking etc.), the acceleration-compensated inclinometer 5 differs in that its output signal does not incur errors or at least only slightly by such external accelerations.

Figure 7:
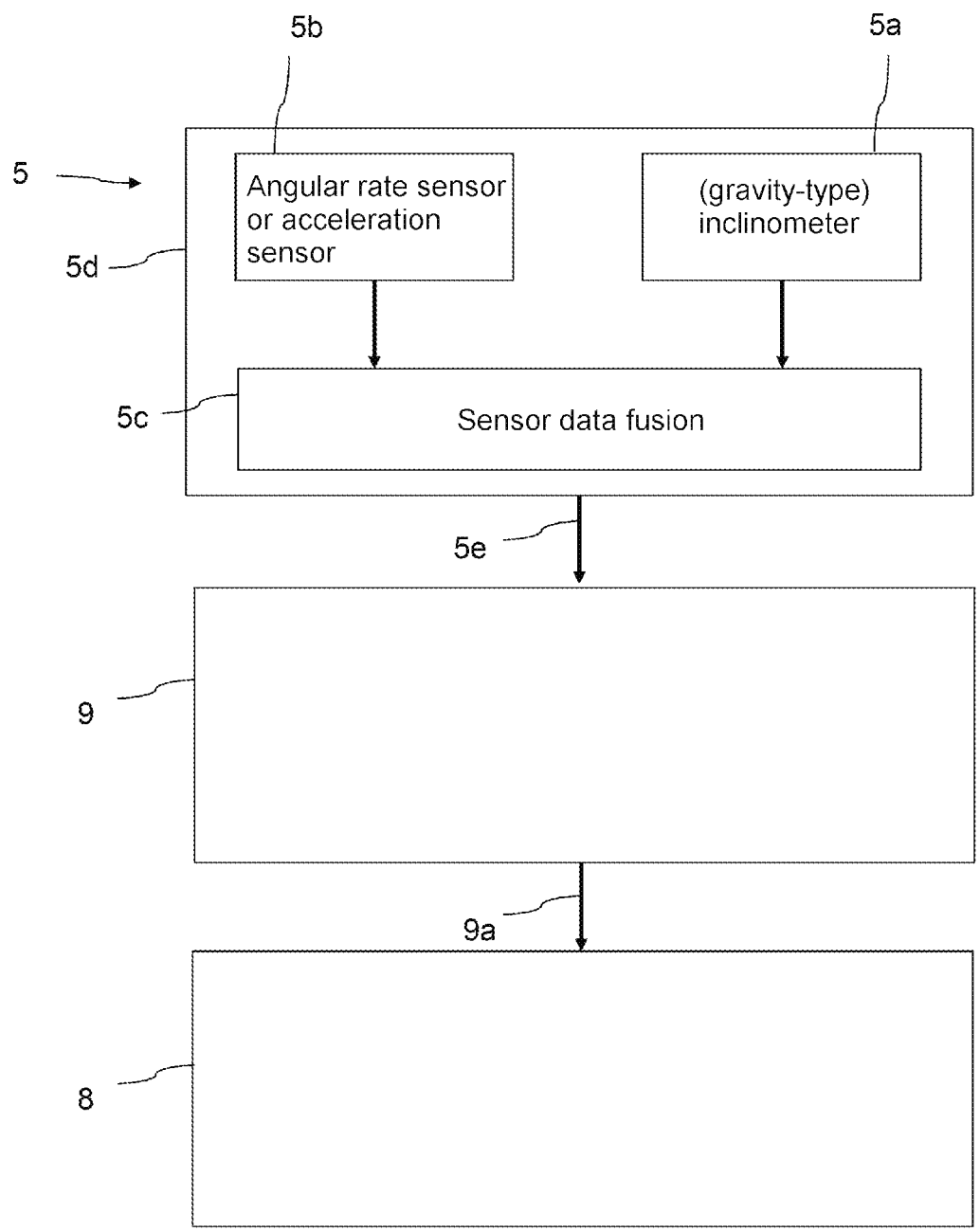
FIG. 7 shows an acceleration-compensated inclinometer and a schematic block diagram for illustrating the processing of sensor signals according to an exemplary embodiment.

To this end, the acceleration-compensated inclinometer 5, as shown schematically in FIG. 7, initially comprises a first measuring apparatus 5a which corresponds to a conventional gravity-type inclinometer. The conventional inclinometer 5a may be a static inclinometer, for example a liquid-based, thermal or MEMS inclinometer, which is configured to determine on two axles the inclination of the sensor 5. Static inclinometers in the static state, where no external accelerations act in addition to the gravitational acceleration, may detect the inclination with a high degree of accuracy, which in this case is normally detected as an absolute value.

Additionally, the acceleration-compensated inclinometer 5 comprises a second measuring apparatus 5b which is designed as an angular rate sensor, for example as a gyroscope. An embodiment as an acceleration sensor is also possible.

Moreover, the acceleration-compensated inclinometer 5 comprises a sensor data fusion apparatus 5c which is configured to process the measured signals both of the inclinometer 5a and the angular rate sensor 5b and in this case to link these measured signals in the context of fusion of the sensor data. The sensor data fusion apparatus 5c may be designed as a microcomputer or application-specific integrated switching circuit and on the input side receives the measured signals of the two measuring apparatuses 5a, 5b. The sensor data fusion apparatus 5c is configured initially for time integration of the measured signal of the angular rate sensor 5b by means of an integrator and to calculate a rotational position which is then combined with the rotational position which has been directly measured by the inclinometer 5a.

As a result, a rotational position which is corrected relative to undesired acceleration effects is obtained, said rotational position being output from the acceleration-compensated inclinometer 5 as an output signal 5e and being received on the input side by the control apparatus 9. Both the inclinometer, the angular rate sensor and the sensor data fusion apparatus 5c are surrounded by a common housing 5d of the acceleration-compensated inclinometer 5. In this case, both the inclinometer and the angular rate sensor may be designed as measuring cells without a housing, i.e. without a separate housing, and accommodated in the common housing 5d.

The sensor data fusion apparatus 5c may comprise, for example, means for performing a Kalman filtering and/or means for low pass filtering of the sensor detected, rotational position of the inclinometer 5a. The sensor data fusion apparatus 5c may also comprise means for the comparison of the sensor detected, low pass filtered rotational position under continuous zero balance with the rotational position of the angular rate sensor 5b calculated using the angular velocity, in order to compensate for the angle drift. By way of example, for one possible implementation, reference is made to the sensor data fusion as disclosed in the patent EP 3 007 553 B1. Other known techniques for sensor fusion are also possible in order to combine the rotational position calculated by time integration (integration over time) with the measured rotational position and to determine therefrom a rotational position of the distributor boom 3 which is as accurate as possible. Merely by way of example, fusion algorithms based on recursive Bayes estimation may be used, for example Kalman filters or particle filters for multi-modal probability distribution between the inclinometer apparatuses may be used.

Optionally, a further rotation angle sensor 6 which is arranged between the carrier vehicle 2 and the distributor boom 3 may also be provided for detecting a relative rotation between the carrier vehicle 2 and the distributor boom 3. As a result, the measurement of the rotational position may be further improved.

The control apparatus 9 monitors using the rotational position (rotational position signal 5e), detected by the acceleration-compensated inclinometer 5, whether a controlling signal to the adjustment apparatus 8 has to be altered, and controls the adjustment apparatus 8 accordingly via the output of a corresponding controlling signal 9a which hereinafter is described in more detail with reference to the operating modes described in FIG. 5.

The distributor boom 3 is fastened to the carrier vehicle 2 via a frame-like carrier 11. In this case, the distributor boom is suspended on a suspension 11a of the carrier 11 and pivotably fastened thereby to the carrier 11. The carrier 11 is attached in a height-adjustable manner to the carrier vehicle 2 and/or attached in a height-adjustable manner relative to a ground surface by means of a parallelogram boom 24. For the height adjustment the parallelogram boom 24 is assigned a linear drive 25 in the form of a hydraulic or pneumatic cylinder such that the vertical distance between the distributor boom 3 and a ground surface and/or a plant population is alterable in a variable manner. The carrier 11 is not pivotable about the pivot axis A but the distributor boom 3 is arranged on the carrier 11 so as to be pivotable about the rotational axis A on the suspension 11a. The fastening and suspension, shown here, of the distributor boom 3 on the carrier vehicle 2 is merely by way of example. A plurality of other types of suspension of distributor booms on the carrier vehicle are known from experience and could also be alternatively used.

Figure 2:
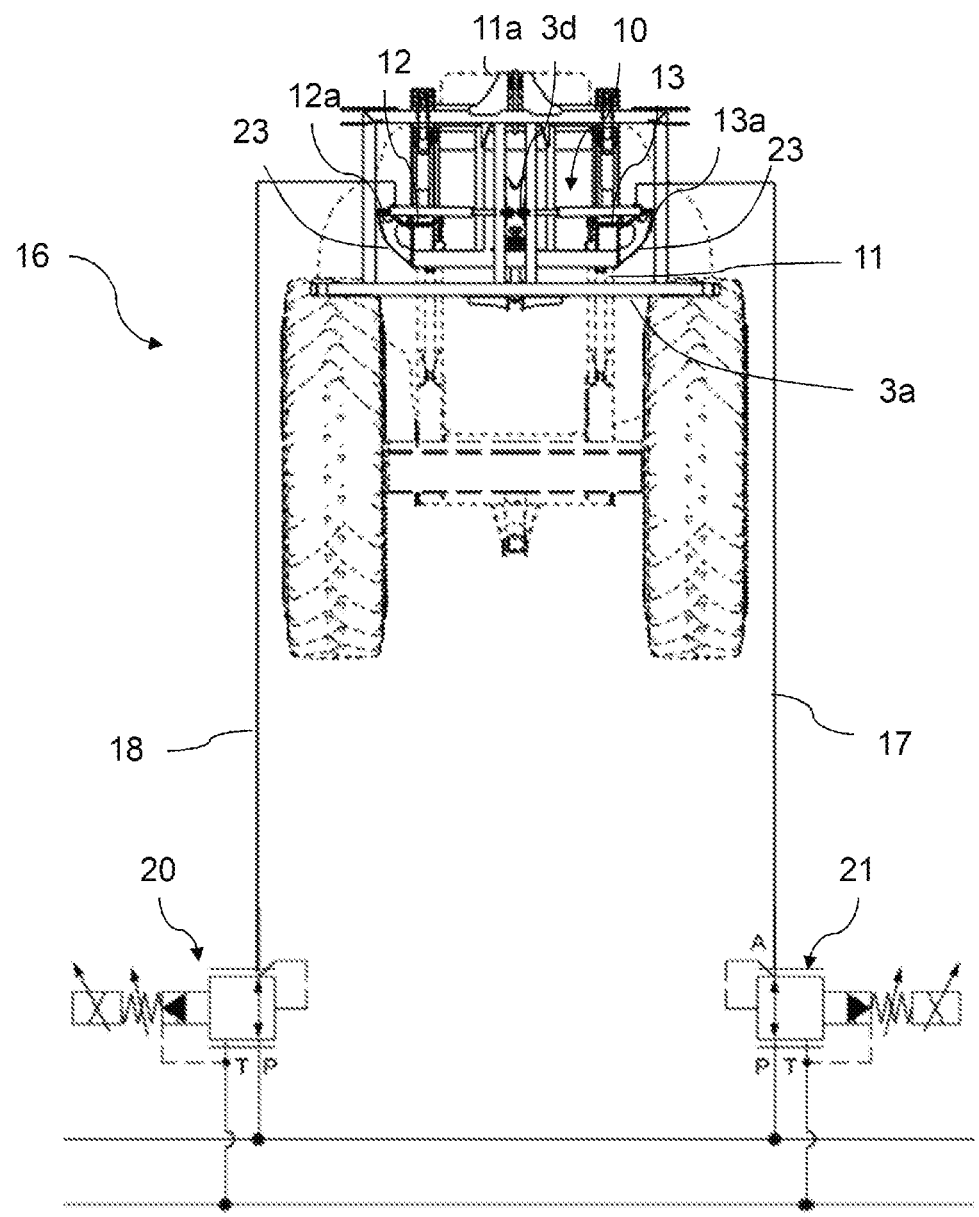
FIG. 2 shows a detailed view of a distributor boom on a frame with a pressure medium-actuated adjustment apparatus according to an exemplary embodiment.
Figure 3:
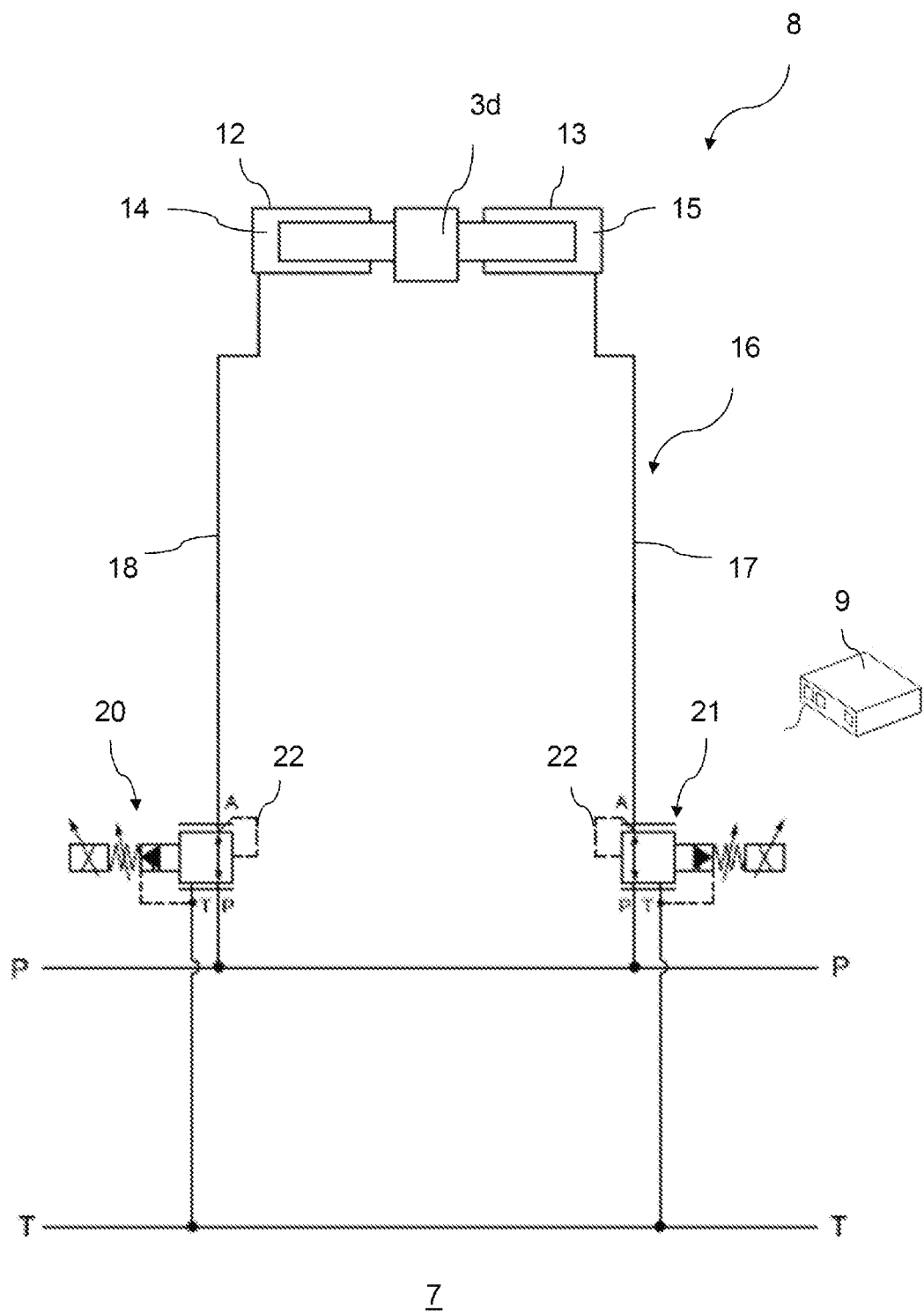
FIG. 3 shows a schematic view of a control apparatus and the pressure medium-actuated adjustment apparatus of the agricultural distribution machine according to an exemplary embodiment.

The distribution machine 1 further comprises a control apparatus 9 for controlling and/or regulating a rotational position of the distributor boom 3 about the pivot axis A, wherein to this end the control apparatus 9 activates a pressure medium-actuated adjustment apparatus 8. The control apparatus and the adjustment apparatus 8 are shown schematically in FIG. 3. The pressure medium-actuated adjustment apparatus 8 comprises two effective regions 14, 15 acting substantially opposingly, an adjustment force being able to be produced thereby in order to move the distributor boom 3 in a targeted manner about the pivot axis A. This may be identified in the detailed view of FIG. 2 and also FIG. 3.

For forming the two effective regions 14, 15 the adjustment apparatus 8 comprises a controlling member 10 in the form of a linear actuator, in this case by way of example as two single-acting, opposingly arranged hydraulic or pneumatic cylinders 12, 13 (also denoted as controlling cylinders). The controlling cylinders 12, 13 are also designed in this case as plunger cylinders. The plunger cylinders are fastened on their housing-side end 12a, 13a to a portion 23 of the carrier 11 protruding in a U-shaped manner. The controlling cylinders 12, 13 are attached to the distributor boom 3 at the front end of the piston rod on a portion 3d of the central part 3a of the distributor boom 3a.

The effective region 14 (or 15) of the controlling cylinder 12 (or 13) corresponds to the region of the controlling cylinder in which the compressive force produced by the pressure medium is converted into a movement of the piston rod of the controlling cylinder 12, 13.

For generating a pressure acting on the piston rod of the controlling cylinders 12, 13, the effective regions 14, 15 are connected to a pressure medium circuit 16. To this end, one respective pressure medium line section 17, 18 is connected to each effective region 14, 15, a pressure medium, for example air or hydraulic fluid, being able to be supplied thereby to the effective regions 14, 15 and removed therefrom. In each case a pressure control valve 20, 21 is arranged in each pressure medium line section 17, 18 for controlling a pressure prevailing at the respective effective region 14, 15. The two pressure control valves 20, 21 are designed as electromagnetically activated proportional pressure control valves. Further components of the fluid circuit, such as the pump and fluid reservoir, are designed in a known manner and not shown.

The two controlling cylinders 12, 13 are arranged opposingly to one another so that two effective regions 14, 15 which act substantially opposingly are formed. This means that a compressive force of the pressure medium in the one effective region 14 and/or the one controlling cylinder 12 produces a displacement force on the distributor boom in the one direction about the pivot axis and a compressive force of the pressure medium in the other effective region 15 and/or the other cylinder 13 produces a displacement force on the distributor boom in the opposing direction about the pivot axis. The pressure and correspondingly the adjustment force in the effective region 14 are set by the pressure control valve 20. The pressure and accordingly the adjustment force in the effective region 15 are set by the pressure control valve 21. By regulating the pressure of the pressure medium prevailing at the effective regions 14, 15 and/or the controlling cylinders 12, 13, therefore, the rotational position of the distributor boom 3 may be influenced.

Figure 4:
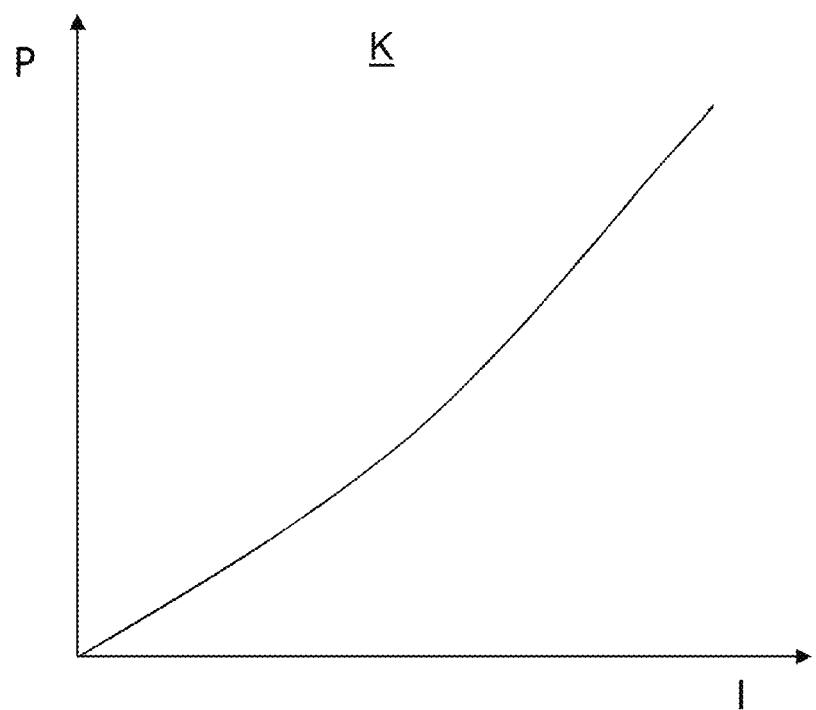
FIG. 4 shows a characteristic curve for activating the pressure control valves according to an exemplary embodiment.

A characteristic curve K is stored in the control apparatus 9 for each of the pressure control valves 20, 21, said characteristic curve establishing a connection between the predetermined target value, for example, of a pressure P to be generated at the effective regions, and an electrical activation signal of the pressure control valves 20, 21, for example the current I applied thereto, which is illustrated schematically in FIG. 4. The control apparatus 9 is configured, in each case using the characteristic curve K, to set the pressure control valves 20, 21, by being electrically controlled, to the predetermined target value.

Figure 5:
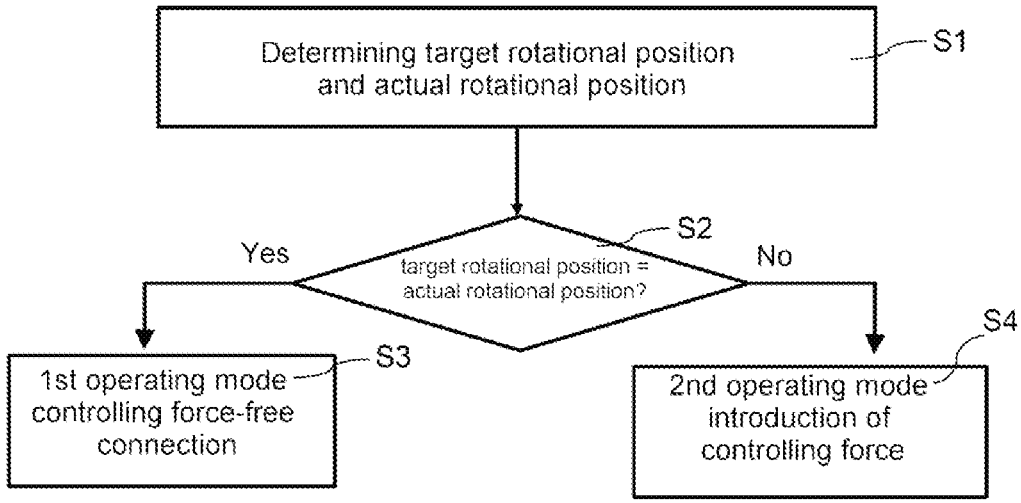
FIG. 5 shows a schematic block diagram for illustrating the control or regulation of the rotational position of the distributor boom according to an exemplary embodiment.

The mode of operation of the control or regulation of the rotational position of the distributor boom 3 is illustrated by way of example with reference to FIGS. 5 to 8. FIG. 5 shows initially a schematic block diagram for illustrating the regulation of the rotational position of the distributor boom 3 according to an exemplary embodiment. During operation of the agricultural distribution machine 1, i.e. when the distributor boom is in the folded-out state and thus is in the working position, it is necessary to set the rotational position thereof to a desired target rotational position in order, for example, to set a uniform distance of the spray nozzles from the plant population. To this end, the control apparatus 9 is designed in terms of program technology to monitor continuously whether the current rotational position of the distributor boom 3 corresponds to the desired target rotational position. To this end, initially the target rotational position and the present rotational position of the distributor boom 3 are determined (step S1 in FIG. 5).

The target rotational position may be determined, for example, by using the measured values of the ultrasonic sensors 26 which at the measuring points of the ultrasonic sensors 26 determine the distance of the distributor boom from the ground and/or from the plant population. The target rotational position may also be predetermined in a different manner, for example by a user input.

The control apparatus 9 further determines the present rotational position of the distributor boom 3 using the output signals 6e of the acceleration-compensated angular rate sensor 5 as described above.

In step S2 it is monitored whether the determined present rotational position of the distributor boom 3 corresponds to the target rotational position. This is the case when the present rotational position no longer deviates from the target rotational position as a predetermined threshold value. If the determined present rotational position of the distributor boom 3 corresponds to the target rotational position, in step S3 an operating mode (first operating mode) is implemented by the control apparatus 9 in which the distributor boom is substantially decoupled from torques about the pivot axis A resulting from vehicle movements about the vehicle longitudinal axis. To this end, a current electrical activation signal of the pressure control valves 20, 21 is kept constant.

In this operating mode, an adjustment force-free connection between the distributor boom and the carrier vehicle is produced by means of the pressure control valves 20, 21 such that, for example, pressure peaks or force fluctuations on the effective regions caused by rolling movements of the carrier vehicle or by movements of the boom may be automatically compensated by the pressure medium control valves, by the pressure or force on the effective regions 14, 15 currently predetermined via the current which is presently applied to the pressure control valves 20, 21 being kept constant. The constant electrical activation signal of the pressure control valves 20, 21 determined by means of the characteristic curve K ensures that disturbance torques introduced into the distributor boom, for example resulting from rolling movements of the carrier vehicle, are immediately equalized, for example compensated, so that these disturbance torques do not lead to an undesired alteration of the rotational position and undesired displacement of the distributor boom.

The pressure control valves 20, 21 have a pressure range of 0 bar to 120 bar. So that, for example, no undesired adjustment force is introduced into the distributor boom 3, for example, both effective regions 14, 15 of the adjustment apparatus are subjected to a constant pressure, for example 30 bar, as a predetermined target value merely by way of example. In other words, in the first operating mode both effective regions 14, 15 and/or cylinder chambers of the controlling cylinders 12, 13 are subjected to 30 bar, for example.

If brief "pressure peaks" are produced at the effective regions 14, 15, for example due to movements of the boom, these are accordingly compensated immediately by means of the pressure control valves 20, 21 so that such brief pressure peaks never lead to an undesired displacement of the distributor boom 3. In other words, this means that the pressure control valves 20, 21 are automatically configured to keep constant the pressure set via the corresponding current applied, on the basis of the characteristic curve K of the control apparatus 9. This is shown by the line connection on the pressure control valve 20, 21 identified by the reference numeral 22. Additional pressure sensors are accordingly not necessary. The forces are thus automatically kept in balance. Disturbance torques acting on the distributor boom 3, for example resulting from rolling movements of the carrier vehicle 2, therefore, may be efficiently compensated, before they lead as undesired adjustment forces to a displacement of the rotational position of the distributor boom 3.

If the determined, present rotational position of the distributor boom 3 does not correspond to the target rotational position, i.e. deviates therefrom by more than a threshold value, in step S4 a further operating mode (second operating mode) is implemented by the control apparatus 9 in which the control apparatus 9 activates the adjustment apparatus 8 such that a defined displacement force is introduced into the distributor boom 3 in order to rotate the distributor boom back into the target rotational position.

Figure 6:
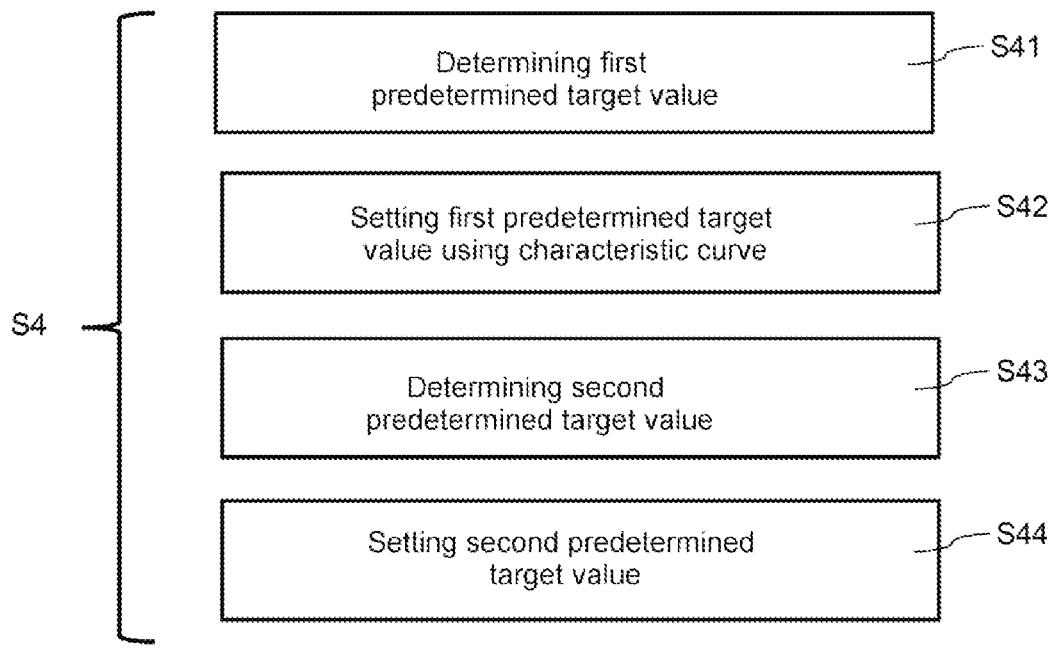
FIG. 6 shows a schematic block diagram for illustrating a second operating mode according to an exemplary embodiment.
Figure 8:
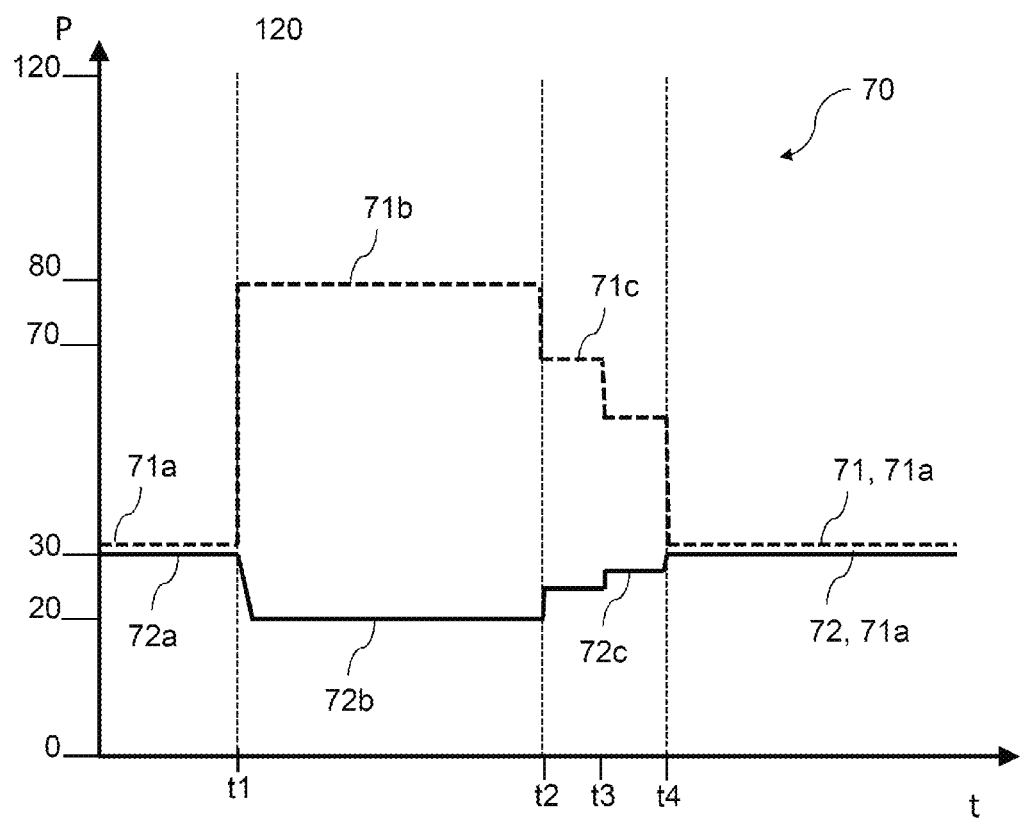
FIG. 8 shows by way of example a temporal curve of the predetermined target value in the second operating mode according to an exemplary embodiment.

An exemplary embodiment of the second operating mode is shown in FIGS. 6 and 8. In FIG. 8 the dashed line 71 shows the temporal curve of the predetermined target value of the effective region 14 and the solid line 72 shows the temporal curve of the predetermined target value of the effective region 15. Until the time t1, the predetermined target value at both effective regions has the value of 30 bar (portions 71a and 72a) so that the distributor boom is held in the current rotational position.

If at the time t1 it results in a deflection of the distributor boom 3, initially using the deviation of the present rotational position from the target rotational position, a new predetermined target value (step S41) for each effective region 14, 15 of a pressure of the pressure medium acting on the effective regions 14, 15 is determined. Using the deviation of the present rotational position from the target rotational position and the known mass inertia of the distributor boom 3 the control apparatus 9 determines which torque has to be introduced into the distributor boom via the controlling device 8, in order to reach the target position, i.e. the target rotational position. In other words, the control apparatus 9 is configured to determine a new predetermined target value, i.e. which displacement force (cylinder force) is required and/or which pressure is required on the controlling cylinders 12, 13. This predetermined target value, i.e. this pressure, is then produced using the characteristic curve K at the pressure control valve (step S42). This predetermined target value is denoted in FIG. 6 as the first predetermined target value. The characteristic curve K predetermines for the determined value of the predetermined target value the current applied to the pressure control valves 20, 21.

In turn, merely by way of example, the deviation of the present rotational position from the target rotational position may result in that, starting from 30 bar at both effective regions 14, 15, a pressure of 80 bar is required at the effective region 14 and a pressure of 20 bar is required at the effective region 15 in order to produce a corresponding displacement force which rotates the distributor boom into the target position. From the characteristic curve K, therefore, the corresponding values of current applied to the pressure control valves 20, 21 are generated for the new predetermined target values of 20 bar and 80 bar. Accordingly, the pressure control valves 20, 21 are electrically activated by the control apparatus 9 so that the pressure control valves via their pressure regulation automatically set the new predetermined target values at the effective regions 14, 15.

A particularity of the present embodiment, however, is that this pressure difference 80 bar–20 bar=60 bar is not kept constant until, for example, the target position is reached and then regulated, by for example 30 bar, back to 30 bar. Rather, these values (30 bar) which are required for holding the distributor boom 3 in the target position, are approached in a stepwise manner, in which further (second) predetermined target values in step S43 are determined and set using the characteristic curve 6 (step S44).

This is illustrated in FIG. 8 by the step-like path of the predetermined target values 71, 72 in the region between t2 and t4. Shortly before reaching the target rotational position, the control apparatus 9 incrementally reduces the predetermined target value in a step-like manner. In the present case at the time t2 the predetermined target value 71 of the effective region 15 is reduced to 70 bar and the predetermined target value 72 of the effective region 15 is increased to 25 bar. At the time t3 the predetermined target value 71 of the effective region 14 is reduced further to 60 bar and the predetermined target value 72 of the effective region 15 increased further to 28 bar. At the time t4 when reaching the target rotational position, therefore, at both effective regions 14, 15 a predetermined target value (third predetermined target value) of 30 bar is again predetermined in order to keep the distributor boom in the target rotational position which has been reached.

How these differences of the predetermined target values and/or the step-like path are defined may also be dependent on the respective rotational position. For example, optionally the number of second predetermined target values and/or the deviation thereof from the first and third predetermined target value may be established as a function of the deviation of the specific rotational position from the target rotational position of the distributor boom 3.

The approximation shown in FIG. 8 of the third predetermined target value by means of the second predetermined target value in order to implement the step-like path, provides the particular advantage that before reaching the target rotational position the distributor boom is actively braked and/or damped so that a rapid setting of the target rotational position is permitted, as far as possible without, or with little, overshooting.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

LIST OF REFERENCE NUMERALS

1 Agricultural distribution machine, for example towed field sprayer
2 Carrier vehicle
3 Distributor boom
3*a* Central part
3*b*, 3*c* Cantilevered arm
3*e* Fastening portion on central part
5 Acceleration-compensated inclinometer apparatus
5*a* First inclinometer apparatus, for example gravity-type inclinometer
5*b* Second inclinometer apparatus, for example angular rate sensor
5*c* Sensor data fusion apparatus
5*d* Housing
5*e* Output signal
6 Sensor for detecting relative rotation to carrier vehicle
8 Pressure medium-actuated adjustment apparatus
9 Control apparatus
9*a* Output signal
10 Controlling member
11 Carrier
11*a* Suspension
12 Controlling cylinder, for example single-acting plunger cylinder
12*a* Fastening point
13 Controlling cylinder, for example single-acting plunger cylinder
13*a* Fastening point
14 First effective region
15 Second effective region
16 Pressure medium circuit
17 Pressure medium line section 18 Pressure medium line section
19 Spreading means, for example spray nozzles
20 Pressure control valve
21 Pressure control valve
22 Control line
23 Carrier portion
24 Height-adjustable parallelogram linkage
25 Lifting cylinder
26 Ultrasonic sensors
70 Predetermined target value
71, 71a-c Predetermined target value for first effective region
72, 72a-c Predetermined target value for second effective region
A Pivot axis
K Characteristic curve

What is claimed is:
1. An agricultural distribution machine comprising:
a carrier vehicle;
a distributor boom for spreading fertilizer, plant protection agent, or seed, wherein the distributor boom is arranged on the carrier vehicle so as to be movable at least about a pivot axis running in a direction of travel of the carrier vehicle, wherein the distributor boom comprises a plurality of segments that are pivotable relative to one another about upright axes or pivotable relative to one another in a plane arranged perpendicular to the direction of travel of the agricultural distribution machine;
a distance sensor apparatus configured to detect a distance of the distributor boom from a ground surface or a plant population or both;
an acceleration-compensated inclinometer apparatus that determines a rotational position of the distributor boom and which outputs an acceleration-compensated inclination signal, the acceleration-compensated inclination signal being an inclination signal which is corrected relative to external acceleration effects which cause errors in the inclination measurement, in order to avoid or at least to reduce errors in the inclination measurement due to such external accelerations, wherein components of the acceleration-compensated inclinometer apparatus include all sensor apparatuses and data processing apparatuses of the acceleration-compensated inclinometer apparatus which are required for determining the acceleration-compensated inclination signal and wherein the components of the acceleration-compensated inclinometer apparatus are housed by a common housing and coupled together mechanically so that the components are subjected to the same inclination and the same acceleration;
an adjustment apparatus, an adjustment force being generated thereby to move the distributor boom about the pivot axis, wherein the adjustment apparatus is configured as a pressure medium-actuated adjustment apparatus with two effective regions acting substantially opposingly, a controlling force being generated thereby to move the distributor boom about the pivot axis, wherein a pressure medium control valve is assigned to each effective region for controlling a pressure or volumetric flow prevailing on the respective effective region; and
a control apparatus for controlling a rotational position of the distributor boom about the pivot axis, wherein the control apparatus is configured to:
generate control signals for activating the adjustment apparatus as a function of output signals of the acceleration-compensated inclinometer apparatus;
determine as a function of the determined rotational position of the distributor boom a target value of a pressure acting on the effective regions or a controlling force of the pressure medium acting on the effective regions and to set the pressure medium control valves, in each case by being electrically controlled, to the target value;
set the pressure medium control valves in each case using a predetermined characteristic curve of the pressure medium control valves, by being electrically controlled, to the target value, wherein the characteristic curve of the pressure medium control valves establishes a connection between the target value and the electrical activation signal of the pressure medium control valves; and
determine the target value without a pressure value or volumetric flow value of the pressure medium detected by a pressure or volumetric flow sensor, such that the control apparatus is configured to determine a control current for activating the pressure medium control valves exclusively using the characteristic curve and the rotational position of the distributor boom detected by means of the acceleration-compensated inclinometer apparatus.

2. The agricultural distribution machine according to claim 1, wherein the acceleration-compensated inclinometer apparatus comprises means for compensating for external accelerations that act in addition to a gravitational acceleration on the acceleration-compensated inclinometer apparatus.

3. The agricultural distribution machine according to claim 2, wherein the external accelerations are transverse accelerations.

4. The agricultural distribution machine according to claim 1, wherein the acceleration-compensated inclinometer apparatus includes one or more of an acceleration sensor or an angular rate sensor, or a gyroscope, and is configured to deduct disturbance variables that occur as a function of measured values of the one or more acceleration sensor or, angular rate sensor, or gyroscope which incur errors in an inclination measurement and which are caused by external accelerations that act in addition to gravitational acceleration on the acceleration-compensated inclinometer apparatus.

5. The agricultural distribution machine according to claim 4, wherein the external accelerations are transverse accelerations.

6. The agricultural distribution machine according to claim 1, wherein the acceleration-compensated inclinometer apparatus comprises:
a first inclinometer apparatus;
a second inclinometer apparatus that is based on a measuring principle that is different than the first inclinometer apparatus; and
a fusion apparatus that is configured to compute measured values of the first inclinometer apparatus with measured values of the second inclinometer apparatus in order to compensate for the effects of movement-related accelerations on the inclination measurement.

7. The agricultural distribution machine according to claim 6, wherein:
the first inclinometer apparatus is configured as a (quasi) static inclinometer that measures an inclination relative to gravity and an inclination measurement thereof incurs errors due to external accelerations that occur in addition to the gravitational acceleration; and the second inclinometer apparatus comprises an acceleration sensor and/or angular rate sensor.

8. The agricultural distribution machine according to claim 6, wherein the fusion apparatus is configured to integrate over time the measured values of the second inclinometer apparatus for determining a rotational position of the distributor boom and is further configured, by means of a data fusion calculation, to link or combine the time integrated values with the measured values of the first inclinometer apparatus to determine an acceleration-compensated rotational position of the distributor boom.

9. The agricultural distribution machine according to claim 1, wherein the control apparatus is configured to determine a current rotational position of the distributor boom only as a function of the output signal of the acceleration-compensated inclinometer apparatus.

10. The agricultural distribution machine according to claim 1, wherein the control apparatus is configured to determine a current rotational position of the distributor boom as a function of the output signals of the acceleration-compensated inclinometer apparatus and the output signals of a rotational angle sensor that is arranged between the carrier vehicle and the distributor boom and that detects a relative rotation between the carrier vehicle and the distributor boom.

11. The agricultural distribution machine according to claim 1, wherein the control apparatus is configured:

such that if the determined rotational position corresponds to a target rotational position of the distributor boom or no longer deviates by a threshold value from the target rotational position, to keep constant an electrical activation signal of the pressure medium control valves assigned to the target value and not to introduce any controlling forces into the distributor boom; or to implement a first operating mode in which the distributor boom is substantially decoupled from torques about the pivot axis resulting from vehicle movements about a vehicle longitudinal axis, wherein an electrical activation signal of the pressure medium control valves corresponding to the target value is kept constant.

12. The agricultural distribution machine according to claim 1, wherein the adjustment apparatus comprises a dual-acting fluidic pressure medium cylinder or two single-acting pressure medium cylinders operating opposingly, or is configured to move the distributor boom in both rotational directions about the pivot axis running in the direction of travel at an angular velocity of at least 0.1 rad/s.

13. The agricultural distribution machine according to claim 12, wherein the adjustment apparatus comprises two plunger cylinders that form the two effective regions acting substantially opposingly.

14. The agricultural distribution machine according to claim 1, wherein the distributor boom comprises a plurality of segments including a central part and lateral cantilevered arms that are pivotable relative to one another.

15. The agricultural distribution machine according to claim 1, further comprising a storage container for the material to be spread and a plurality of distribution elements fastened to the distributor boom at regular intervals and selectively brought into fluidic connection with the storage container.

16. The agricultural distribution machine according to claim 1, further comprising a height adjustment apparatus for adjusting the height of the distributor boom relative to the carrier vehicle.

17. The agricultural distribution machine according to claim 1, wherein the distributor boom comprises a plurality of segments and wherein the distance sensor apparatus comprises a plurality of distance sensors, wherein the plurality of distance sensors are arranged on one or more of the segments and configured to measure a distance of a respective segment from the ground or from the plant population or both.

18. An agricultural distribution machine comprising:

a carrier vehicle;

a distributor boom for spreading fertilizer, plant protection agent, or seed, wherein the distributor boom is arranged on the carrier vehicle so as to be movable at least about a pivot axis running in a direction of travel of the carrier vehicle, wherein the distributor boom comprises a plurality of segments that are pivotable relative to one another about upright axes or pivotable relative to one another in a plane arranged perpendicular to the direction of travel of the agricultural distribution machine;

a distance sensor apparatus configured to detect a distance of the distributor boom from a ground surface or a plant population or both;

an acceleration-compensated inclinometer apparatus that determines a rotational position of the distributor boom and which outputs an acceleration-compensated inclination signal, the acceleration-compensated inclination signal being an inclination signal which is corrected relative to external acceleration effects which cause errors in the inclination measurement, in order to avoid or at least to reduce errors in the inclination measurement due to such external accelerations, wherein components of the acceleration-compensated inclinometer apparatus include all sensor apparatuses and data processing apparatuses of the acceleration-compensated inclinometer apparatus which are required for determining the acceleration-compensated inclination signal and wherein components of the acceleration-compensated inclinometer apparatus are housed by a common housing and are arranged at the same location on the distributor boom;

an adjustment apparatus, an adjustment force being generated thereby to move the distributor boom about the pivot axis, wherein the adjustment apparatus is configured as a pressure medium-actuated adjustment apparatus with two effective regions acting substantially opposingly, a controlling force being generated thereby to move the distributor boom about the pivot axis, wherein a pressure medium control valve is assigned to each effective region for controlling a pressure or volumetric flow prevailing on the respective effective region; and a control apparatus for controlling a rotational position of the distributor boom about the pivot axis, wherein the control apparatus is configured to:

generate control signals for activating the adjustment apparatus as a function of output signals of the acceleration-compensated inclinometer apparatus;

determine as a function of the determined rotational position of the distributor boom a target value of a pressure acting on the effective regions or a controlling force of the pressure medium acting on the effective regions and to set the pressure medium control valves, in each case by being electrically controlled, to the target value;

set the pressure medium control valves in each case using a predetermined characteristic curve of the pressure medium control valves, by being electrically controlled, to the target value, wherein the characteristic curve of the pressure medium control valves establishes a connection between the target value and the electrical activation signal of the pressure medium control valves; and determine the target value without a pressure value or volumetric flow value of the pressure medium detected by a pressure or volumetric flow sensor, such that the control apparatus is configured to determine a control current for activating the pressure medium control valves exclusively using the characteristic curve and the rotational position of the distributor boom detected by means of the acceleration-compensated inclinometer apparatus.

* * * * *